(12) United States Patent
Nadakuduti et al.

(10) Patent No.: US 12,349,078 B2
(45) Date of Patent: Jul. 1, 2025

(54) SIMULTANEOUS PRIMARY AND SECONDARY RADIO FREQUENCY LINK TRANSMISSIONS WITHIN RADIO FREQUENCY EXPOSURE LIMITS

(71) Applicant: QUALCOMM Incorporated, San Diego, CA (US)

(72) Inventors: Jagadish Nadakuduti, Bermuda Dunes, CA (US); Lin Lu, San Diego, CA (US); Paul Guckian, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/956,744

(22) Filed: Sep. 29, 2022

(65) Prior Publication Data
US 2023/0105877 A1 Apr. 6, 2023

Related U.S. Application Data

(60) Provisional application No. 63/251,551, filed on Oct. 1, 2021.

(51) Int. Cl.
*H04W 52/14* (2009.01)
*H04W 52/16* (2009.01)
*H04W 52/18* (2009.01)
*H04W 52/36* (2009.01)

(52) U.S. Cl.
CPC ............ *H04W 52/16* (2013.01); *H04W 52/18* (2013.01); *H04W 52/367* (2013.01)

(58) Field of Classification Search
CPC ... H04W 52/16; H04W 52/18; H04W 52/367; H04W 52/146; H04W 52/225; H04W 52/246; H04W 52/346; H04W 52/38
See application file for complete search history.

(56) References Cited

U.S. PATENT DOCUMENTS

| | | | |
|---|---|---|---|
| 9,763,199 B2 | 9/2017 | Pelletier et al. | |
| 2015/0305043 A1* | 10/2015 | Chmiel | H04W 52/36 370/329 |
| 2017/0064641 A1* | 3/2017 | Logan | H04W 52/367 |
| 2021/0297959 A1* | 9/2021 | Zhou | H04W 52/365 |

OTHER PUBLICATIONS

International Search Report and Written Opinion—PCT/US2022/045459—ISA/EPO—Jan. 23, 2023.

* cited by examiner

*Primary Examiner* — Angelica Perez
(74) *Attorney, Agent, or Firm* — Loza & Loza, LLP/Qualcomm Incorporated

(57) ABSTRACT

Simultaneous primary and secondary radio frequency link transmissions are described. The transmissions are restricted to within radio frequency exposure limits. A method is described that includes determining an unused power margin between an average transmit power of a primary radio and the transmit power limit. A combination of a portion of the unused power margin and a secondary reserve transmit power are allocated to the secondary radio. The average transmit power of the secondary radio is restricted to within the combination.

24 Claims, 8 Drawing Sheets

SIMULTANEOUS PRIMARY AND SECONDARY RADIO FREQUENCY LINK TRANSMISSIONS WITHIN RADIO FREQUENCY EXPOSURE LIMITS

CROSS-REFERENCE TO RELATED APPLICATIONS

The present Application for Patent claims priority to U.S. Provisional Application No. 63/251,551, filed Oct. 1, 2021, and assigned to the assignee hereof and hereby expressly incorporated by reference herein as if fully set forth below and for all applicable purposes.

TECHNICAL FIELD

Aspects of the present disclosure relate generally to radio communication systems, and in particular, to maintaining simultaneous primary and secondary radio frequency link transmissions within radio frequency exposure limits.

INTRODUCTION

Wireless communication devices have become smaller, more portable, and more capable. Increasingly users rely on wireless communication devices for mobile phone use as well as for email, media consumption, gaming, and Internet access. Devices such as cellular telephones, personal digital assistants (PDAs), laptop computers, and other similar devices provide reliable service in part by using multiple radios and by communicating on multiple radio bands, sometimes using multiple protocols and services. Such devices may be referred to as mobile stations, stations, access terminals, user terminals, subscriber units, user equipment, and similar terms.

Governmental and regulatory agencies have established restrictions on the amount of radio frequency energy that a wireless device may emit. This is in part to protect other electrical devices and in part to protect people, both users and others nearby. Wireless devices, including mobile telephones, are required to undergo testing to determine the amount of Radio Frequency (RF) energy directed toward a user when using the device. In the U.S., the Federal Communications Commission (FCC) certifies RF devices to ensure compatibility with the regulatory limits. One of the restrictions concerns RF exposure metrics (either specific absorption rate (SAR) or power density (PD)). SAR is defined as the power absorbed per unit mass of human tissue in mW/g (milliwatts per gram) and is applicable for transmitter frequencies less than 6 GHz in the case of FCC regulations. PD is defined as the power density incident on unit area of human tissue in $mW/cm^2$ (milliwatts per square centimeter) and is applicable for transmitter frequencies greater than 6 GHz in the case of FCC regulations (typically used for quantifying RF exposure from mmW radios).

Current FCC testing requirements define a separation distance between the smartphone and a human phantom or simulated body and measure the rate at which RF energy emitted by the device is absorbed by the human phantom. FCC certification of wireless devices requires SAR measurements be taken by attaching the wireless device to the human phantom which is filled with a liquid simulating human tissue. The required measurements are taken in five positions relative to the human phantom and produce five different SAR distributions. Additional SAR measurements are also required at multiple channels in a given frequency band for a particular antenna and transmitter combination. The FCC reviews the data from all positions and channels, resulting in the reporting of hundreds of measurements for all bands, transmitter, and antenna combinations The testing procedures result in a SAR limit based on the maximum average power. However, the current compliance test procedure effectively results in also restricting instantaneous power because when high power transmissions occur, the SAR limit is reached quickly and an immediate cessation of transmission may be needed to remain within the SAR window for that time window. The SAR is directly proportional to transmit power. Since the time-averaged transmit power should be less than the regulatory limit, a transmitter may only transmit at high power for short bursts of time and once the SAR limit is reached no further transmission is permitted until after a dissipation time. In some circumstances, with no transmissions, a call or session may be dropped. In any circumstance, communication is slowed. To prevent a complete transmission stop, the transmitter power is managed. Bursts of high power are restricted to conserve a margin against the SAR limits to maintain the radio connection or session.

SUMMARY

The following presents a simplified summary of one or more aspects of the present disclosure in order to provide a basic understanding of such aspects. This summary is not an extensive overview of all contemplated features of the disclosure, and is intended to neither identify key or critical elements of all implementations nor to delineate the scope of any or all implementations. Its sole purpose is to present some concepts of one or more aspects of the disclosure in a simplified form as a prelude to the more detailed description that is presented later.

An aspect of the disclosure relates to a method. The method includes determining an unused power margin between a current time-averaged transmit power of a primary radio across a time window at a sequence of time intervals and a transmit power limit, allocating a portion of the unused power margin to a secondary radio, allocating a secondary reserve transmit power to the secondary radio, wherein the secondary reserve transmit power is less than the transmit power limit, restricting a secondary radio average transmit power to within a combination of the portion of the unused power margin and the secondary reserve transmit power, and further restricting a average transmit power of the primary radio to within a combination of a primary reserve transmit power and a transmit power margin, the transmit power margin determined by reducing the unused power margin by a secondary radio estimated margin to maintain the secondary reserve transmit power.

In one implementation, determining an unused power margin comprises normalizing the current time-averaged transmit power to its transmit power limit corresponding to a radio frequency exposure limit. In one implementation, restricting the secondary radio average transmit power comprises restricting the secondary radio average transmit power to the unused power margin during the current time interval. One implementation includes allocating a primary reserve transmit power to the primary radio, wherein the primary reserve transmit power is less than the transmit power limit and wherein restricting the average transmit power of the primary radio comprises allowing transmit power up to the primary reserve transmit power during the current time interval, and wherein determining the unused power margin comprises determining unused margin within the primary reserve transmit power.

In one implementation determining the unused power margin comprises determining the unused margin within the primary reserve transmit power. In one implementation determining the unused power margin further includes determining the unused power margin as between the primary reserve transmit power and the transmit power limit. One implementation includes computing the secondary radio estimated margin based on the secondary reserve transmit power and the secondary radio average transmit power. One implementation includes de-allocating the secondary reserve transmit power from the secondary radio after detecting that the secondary radio is turned OFF.

In one implementation restricting the secondary radio average transmit power comprises restricting the secondary radio to the secondary reserve transmit power. In one implementation restricting the secondary radio average transmit power comprises restricting the secondary radio to the secondary reserve transmit power and the unused margin. In one implementation, restricting the secondary radio average transmit power comprises terminating transmission by the secondary radio during the current time interval after the secondary radio average transmit power uses the unused margin. In one implementation wherein restricting the secondary radio average transmit power comprises determining a secondary radio average transmit power across a current time interval after detecting that the secondary radio is turned ON and determining a new secondary radio average transmit power after each time interval to include a new current time interval up to the fixed number of time intervals of the current time window.

Another aspect of the disclosure relates to another method. The method includes determining a average transmit power of the primary radio across a time window at a sequence of time intervals, wherein the time window advances each time interval of the sequence of time intervals to include a fixed number of time intervals, restricting the average transmit power of the primary radio during a current time interval to within a normalized radio frequency exposure limit for a current time window using a current time-averaged transmit power of the current time window, detecting that a secondary radio is turned ON, determining an unused power margin between the current time-averaged transmit power and the normalized radio frequency exposure limit, allocating a portion of the unused power margin to the secondary radio after detecting that the secondary radio is turned ON, allocating a secondary reserve transmit power to the secondary radio after detecting that the secondary radio is turned ON, wherein the secondary reserve transmit power is less than the normalized radio frequency exposure limit, restricting a secondary radio average transmit power to within a combination of the portion of the unused power margin and the secondary reserve transmit power, and further restricting the average transmit power of the primary radio, after detecting that the secondary radio is turned ON, to within a combination of a primary reserve transmit power and the transmit power margin, the transmit power margin determined by reducing the unused power margin by a secondary radio estimated margin to maintain the secondary reserve transmit power.

Another aspect of the disclosure relates to a communication device. The communication device includes at least one antenna, a transmitter in communication with the at least one antenna, and a processor in communication with a memory. The processor is configured to perform operations that include determining an unused power margin between a current time-averaged transmit power of a primary radio across a time window at a sequence of time intervals and a transmit power limit, allocating a portion of the unused power margin to a secondary radio, allocating a secondary reserve transmit power to the secondary radio, wherein the secondary reserve transmit power is less than the transmit power limit, restricting a secondary radio average transmit power to within a combination of the portion of the unused power margin and the secondary reserve transmit power; and further restricting a average transmit power of the primary radio to within a combination of a primary reserve transmit power and a transmit power margin, the transmit power margin determined by reducing the unused power margin by a secondary radio estimated margin to maintain the secondary reserve transmit power.

In one example, the operations further include allocating a primary reserve transmit power to the primary radio, wherein the primary reserve transmit power is less than the transmit power limit and wherein restricting the average transmit power of the primary radio comprises allowing transmit power up to the primary reserve transmit power during the current time interval, and wherein determining the unused power margin comprises determining the unused margin within the primary reserve transmit power. In one example, the operations further include de-allocating the secondary reserve transmit power from the secondary radio after detecting that the secondary radio is turned OFF.

In one example, restricting the secondary radio average transmit power comprises determining a secondary radio average transmit power across a current time interval after detecting that the secondary radio is turned ON and determining a new secondary radio average transmit power after each time interval to include a new current time interval up to the fixed number of time intervals of the current time window.

Another aspect of the disclosure relates to a computer-readable medium to cause a processor to perform operations that include determining an unused power margin between a current time-averaged transmit power of a primary radio across a time window at a sequence of time intervals and a transmit power limit, allocating a portion of the unused power margin to a secondary radio, allocating a secondary reserve transmit power to the secondary radio, wherein the secondary reserve transmit power is less than the transmit power limit, restricting a secondary radio average transmit power to within a combination of the portion of the unused power margin and the secondary reserve transmit power; and further restricting a average transmit power of the primary radio to within a combination of a primary reserve transmit power and a transmit power margin, the transmit power margin determined by reducing the unused power margin by a secondary radio estimated margin to maintain the secondary reserve transmit power.

In one example, the operations for determining the unused power margin include determining the unused power margin as between the primary reserve transmit power and the transmit power limit. In one example the operations include computing the secondary radio estimated margin based on the secondary reserve transmit power and the secondary radio average transmit power.

Another aspect of the disclosure relates to an apparatus. The apparatus includes means for determining an unused power margin between a current time-averaged transmit power of a primary radio across a time window at a sequence of time intervals and a transmit power limit, means for allocating a portion of the unused power margin to the secondary radio and for allocating a secondary reserve transmit power to the secondary radio wherein the secondary reserve transmit power is less than the transmit power limit, and means for restricting a secondary radio average transmit power to within the unused power margin, wherein the means for restricting the average transmit power of the primary radio further restricts the average transmit power of the primary radio to within a combination of a primary reserve transmit power and a transmit power margin, the transmit power margin determined by reducing the unused power margin by a secondary radio estimated margin to maintain the secondary reserve transmit power.

In one example, the means for restricting the secondary radio average transmit power performs restricting the secondary radio average transmit power to the unused power margin during the current time interval. In one example, the means for restricting the secondary radio average transmit power performs terminating transmission by the secondary radio during the current time interval after the secondary radio average transmit power uses the unused margin. In one example, the means for determining the unused power margin determines the unused power margin between the primary reserve transmit power and the transmit power limit. In one example, the means for restricting the secondary radio average transmit power determines a secondary radio average transmit power across a current time interval after detecting that the secondary radio is turned ON and determines a new secondary radio average transmit power after each time interval to include a new current time interval up to the fixed number of time intervals of the current time window These and other aspects of the present disclosure will become more fully understood upon a review of the detailed description, which follows. Other aspects, features, and examples will become apparent to those of ordinary skill in the art, upon reviewing the following description of specific, examples in conjunction with the accompanying figures. While features of the present disclosure may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while examples may be discussed below as device, system, or method examples it should be understood that such examples can be implemented in various devices, systems, and methods.

DETAILED DESCRIPTION

Figure 1:
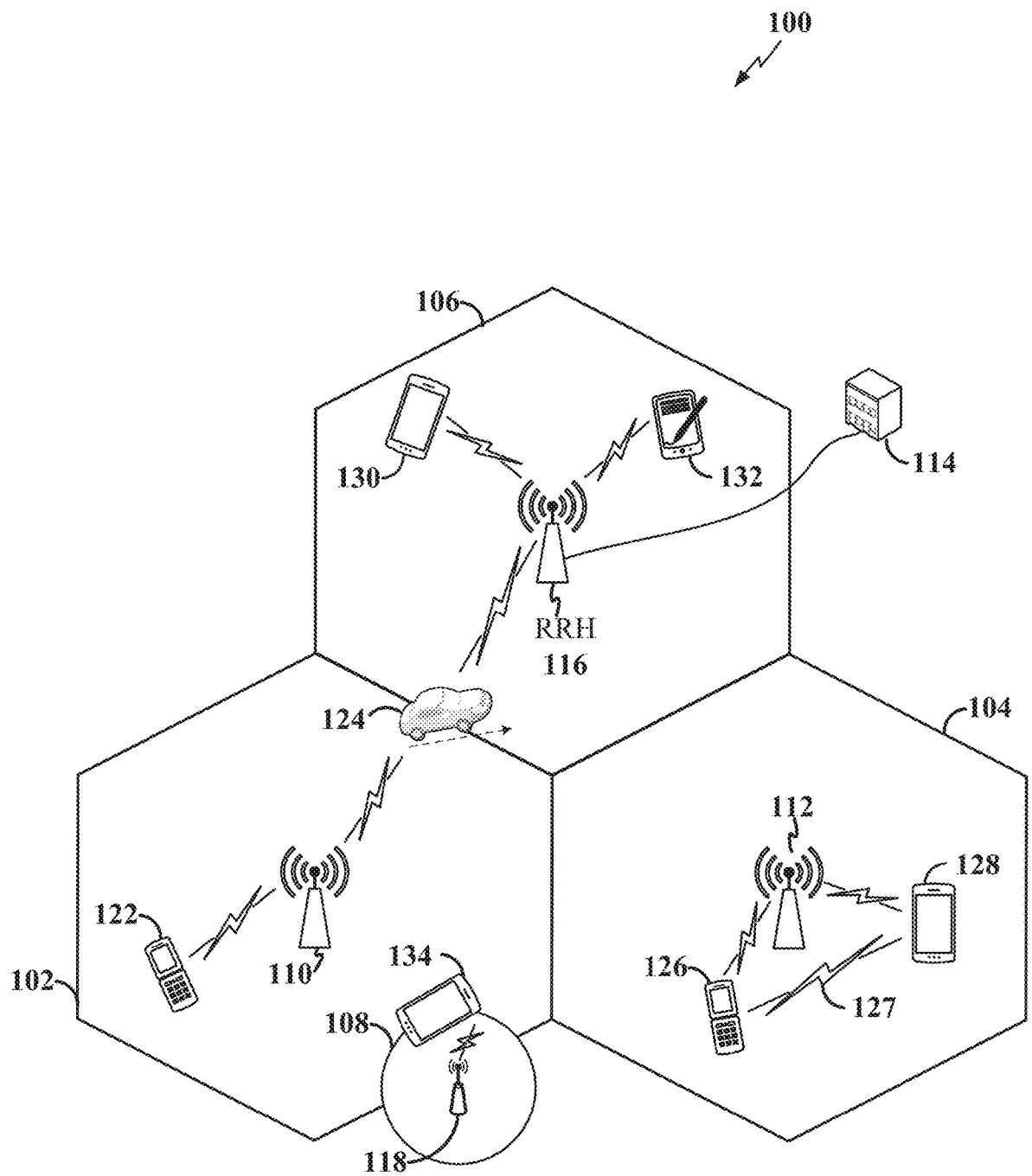
FIG. 1 illustrates a wireless multiple-access communication system, in accordance with certain examples of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Examples disclosed herein provide a method for optimizing time-averaged transmitter power of a communications device. SAR is discussed here as an example, but it will be understood that PD or a combination of SAR and PD may be utilized. The method begins when a time-averaged SAR is computed over a predefined time window. When computing time-averaged SAR, the method assumes that transmitter power is equal to at least the reserve power at all time intervals. If the time-averaged SAR is below the SAR limit, then the method determines the maximum allowable transmit power for the next time interval based on the available SAR margin. The communication device then begins transmitting at a level equal to or less than this computed maximum allowable transmitter power. This process of computing time-averaged SAR, determining SAR margin and allowable maximum transmit power is repeated at the fixed time interval, say five seconds. As the computed time-averaged SAR reaches the SAR limit, i.e., available SAR margin is zero, then the computed maximum allowable transmit power will be equal to reserve transmitter power for the next time interval. The communication device then backs off from high transmitter power to a reserve transmitter power. This backing off occurs after a specific period of time, depending on how soon the total available SAR margin (difference between reserve SAR and SAR limit over predefined time window) is utilized by the mobile device by transmitting at levels higher than the reserve transmitter power. In some aspects, once the predefined time window concludes, the total SAR margin is available for the communication device, allowing it to return to high transmitter power. In some aspects, SAR is computed based on a rolling time-average window, and each new time interval in which transmission is possible is associated with a past time interval over which SAR was previously calculated; thus, as the old time intervals are removed from SAR calculations, the available margin for the new time interval may vary.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, examples or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM (Original Equipment Manufacturer) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes several components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, a first base station 110 is shown in a first cell 102. A second base station 112 is shown in a second cell 104; and a third base station 114 is shown controlling a remote radio head (RRH) 116 in a third cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. The base stations 110, 112, 114, 118 provide wireless access points to a core network for any number of mobile apparatuses.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118. Here, each base station 110, 112, 114, and 118 may be configured to provide an access point to a core network (not shown) for all the UEs in the respective cells. In some aspects of the present disclosure, two or more UE (e.g., UEs 126 and 128) may communicate with each other using peer to peer (P2P) or sidelink signals 127 without relaying that communication through a base station (e.g., base station 112).

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Figure 2:
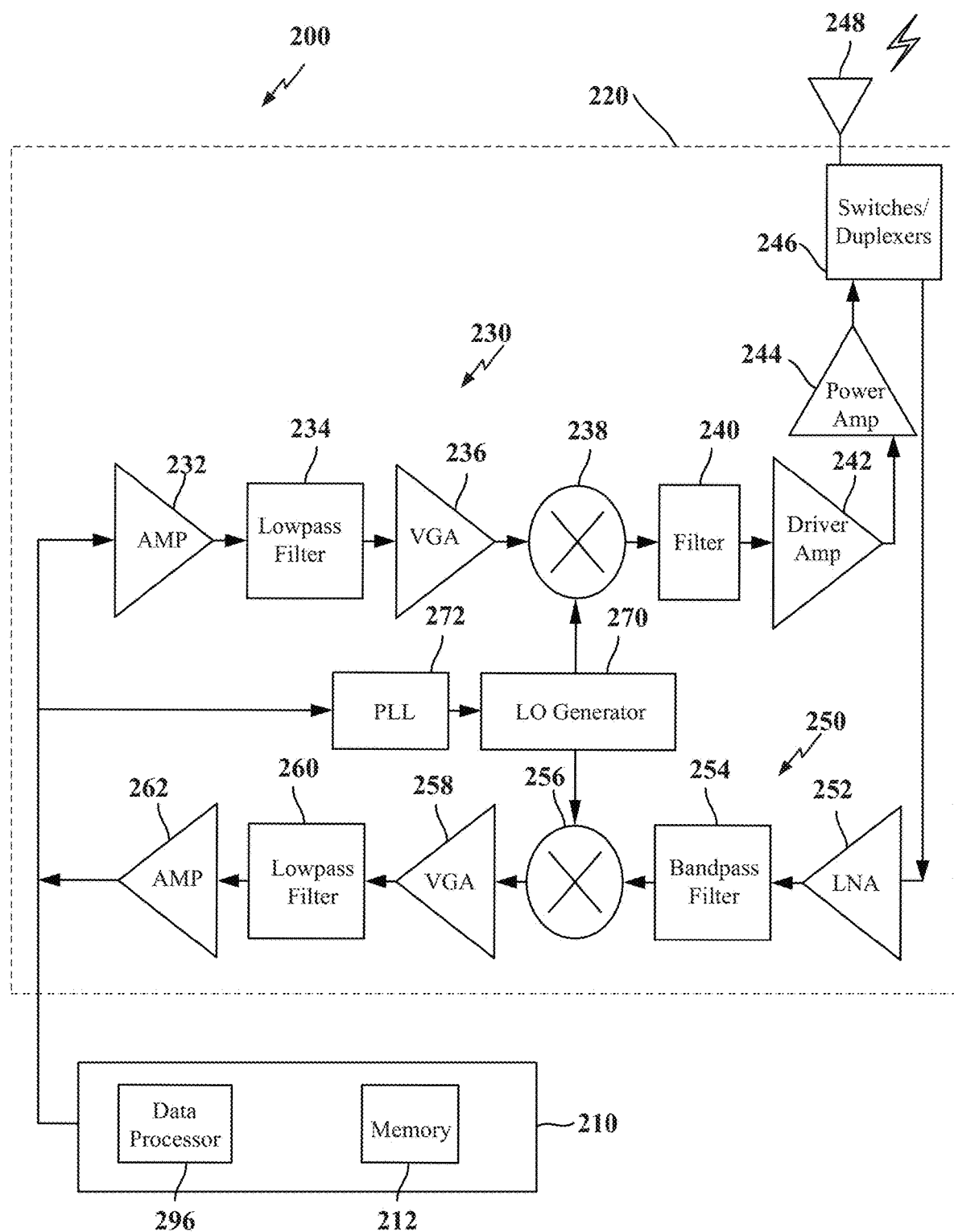
FIG. 2 illustrates a block diagram of a wireless device in accordance with certain examples of the disclosure.

FIG. 2 is a block diagram showing a wireless device 200 in which the exemplary techniques of the present disclosure may be implemented. The wireless device 200 may, for example, be an example of any of the wireless devices illustrated in FIG. 1. FIG. 2 shows an example of a transceiver 220 having a transmitter 230 or transmit chain and a receiver 250 or receive chain. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2. Furthermore, other circuit blocks not shown in FIG. 2 may also be used to condition the signals in the transmitter 230 and receiver 250. Unless otherwise noted, any signal in FIG. 2, or any other figure in the drawings, may be either single-ended or differential. Some circuit blocks in FIG. 2 may also be omitted.

In the example shown in FIG. 2, the wireless device 200 generally comprises the transceiver 220 and a data processor 210. The data processor 210 may include a processor 296 operatively coupled to a memory 212. The memory 212 may be configured to store data and program codes and may generally comprise analog and/or digital processing components. In general, the wireless device 200 may include any number of transmitters and/or receivers for any number of communication systems and frequency bands. All or a portion of the transceiver 220 may be implemented on one or more analog integrated circuits (ICs), radio frequency ICs (RFICs), mixed-signal ICs, etc.

In the transmit path, the data processor 210 processes data to be transmitted and provides in-phase (I) and quadrature (Q) analog output signals to the transmitter 230. In some aspects, the data processor 210 includes one or more digital-to-analog-converters for converting digital signals generated by the data processor 210 into I and Q analog output signals, e.g., I and Q output currents, for further processing. In other examples, the DACs are included in the transceiver 220 and the data processor 210 provides data (e.g., for I and Q) to the transceiver 220 digitally.

Within the transmitter 230, the output signal is amplified by an amplifier (Amp) 232, filtered by a low-pass filter 234 to remove images caused by digital-to-analog conversion, amplified by a variable gain amplifier (VGA) 236, and upconverted from baseband to RF by a mixer 238. The upconverted signal is filtered by a filter 240, further amplified by a driver amplifier 242, and a power amplifier 244, routed through switches/duplexers 246, and transmitted via one or more antennas 248. The transmit RF signal is routed through the switches/duplexers 246 or switch and transmitted via at least one antenna of the one or more antennas 248. While examples discussed herein utilize I and Q signals, those of skill in the art will understand that components of the transceiver may be configured to utilize polar modulation.

In the receive path, the one or more antennas 248 receive signals from base stations and/or other transmitter stations and provides a received signal, which is routed through the switches/duplexers 246 and provided to the receiver 250. Within the receiver 250, the received signal is amplified by a low noise amplifier (LNA) 252, filtered by a bandpass filter 254, and downconverted from RF to baseband by a mixer 256. The downconverted signal is amplified by a VGA 258, filtered by a low-pass filter 260, and amplified by an amplifier 262 to obtain an analog input signal, which is provided to the data processor 210. The switches/duplexers 246 may be designed to operate with a specific RX-to-TX duplexer frequency separation, such that the receive (RX) signals are isolated from the transmit (TX) signals. In the example shown, the data processor 210 includes analog-to-digital-converters (ADC's) for converting the analog input signals into digital signals to be further processed by the data processor 210. In some aspects, the ADCs are included in the transceiver 220 and provide data to the data processor 210 digitally.

FIG. 2 shows the transmitter 230 and the receiver 250 implementing a direct-conversion architecture, which frequency converts a signal between RF and baseband in one stage. The transmitter 230 and/or the receiver 250 may also implement a super-heterodyne architecture, which frequency converts a signal between RF and baseband in multiple stages. A local oscillator (LO) generator 270 generates and provides transmit and receive LO signals to the mixers 238 and 256, respectively. A phase locked loop (PLL) 272 receives control information from the data processor 210 and provides control signals to the LO generator 270 to generate the transmit and receive LO signals at the proper frequencies.

Certain components of the transceiver 220 are functionally illustrated in FIG. 2, and the configuration illustrated therein may or may not be representative of a physical device configuration in certain implementations. For example, as described above, the transceiver 220 may be implemented in various integrated circuits (ICs), RF ICs (RFICs), mixed-signal ICs, etc. In some aspects, the transceiver 220 is implemented on a substrate or board such as a printed circuit board (PCB) having various modules, chips, and/or components. For example, the driver amplifier 242, the filter 240, the power amplifier 244, and the switches/duplexers 246 may be implemented in separate modules or as discrete components. while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

The data processor 210 may perform various functions for the wireless device 200, e.g., processing for the transmitted and received data. The memory 212 may store program codes and data for the data processor 210. The data processor 210 may be implemented on one or more application specific integrated circuits (ASICs) and/or other integrated circuit (IC).

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2, the transmitter 230 and the receiver 250 are implemented with the direct-conversion architecture.

RF devices, including wireless devices as described above in the context of the network described above in FIG. 1 transmit RF energy that may be regulated. For example, some agencies have set limits in terms of a Specific Absorption Rate (SAR) and/or Power Density (PD) with respect to a user of the device. In this regulatory context, SAR, for example, is a measure of the rate at which energy is absorbed by a human body when exposed to an RF electromagnetic field. SAR is defined as the power absorbed per mass of tissue, and has units of milliwatts per kilogram (mW/Kg). SAR may be either averaged over the entire body, known as whole body exposure, or averaged over a smaller sample volume (typically 1 g or 10 g of tissue), known as localized exposure. The resulting value cited is the maximum level measured in the body part studied over the stated volume or mass.

Standards for RF exposure limits may contain specifications of distance, position, frequency, channel type, modulation scheme, etc. Different radios at different times may cause different levels of RF exposure and therefore may be subject to different limits. The RF exposure limit of any particular radio may be normalized to each radio to provide a more uniform measure of an RF exposure limit. Further, the restrictions allow for an average amount of energy over time. A time average allows for lower transmit power to compensate for brief higher transmit power pulses. As described herein, the transmit power of a wireless device may be regulated using an exposure assessment that averages the transmit power over a given time window. The duration of the window may be selected to suit different needs. In the described examples, a six minute time window is used as an example. Six minutes is recommended as a standard by the International Commission on Non-Ionizing Radiation Protection (ICNIRP), to determine the maximum allowable average transmitter power for SAR. SAR is directly proportional to the transmit power. The transmit power may be directly measured and controlled. As described herein, the time-averaged transmitter power is kept below an established power limit so that the transmitter may transmit at high power for short bursts of time. These short bursts may be used for transmitting data files or other similar files. Examples described below provide a method and apparatus for a transmitter to hold some transmit power in reserve to maintain the radio connection, while providing bursts of high power.

Without any technique to regulate the transmit power during use, a device may measure the power as the transmitter is used and then shut off the transmitter when the average is exceeded. This can cause a call or session to be dropped. Alternatively, all transmissions may be restricted to a predefined RF exposure limit. However, many modern wireless devices transmit in irregular bursts. The number, duration, and transmit power of the bursts is irregular so that the predefined RF exposure limit may be lower than necessary except in unusual high burst scenarios. The transmitter is therefore operating at lower power than necessary.

Figure 3:
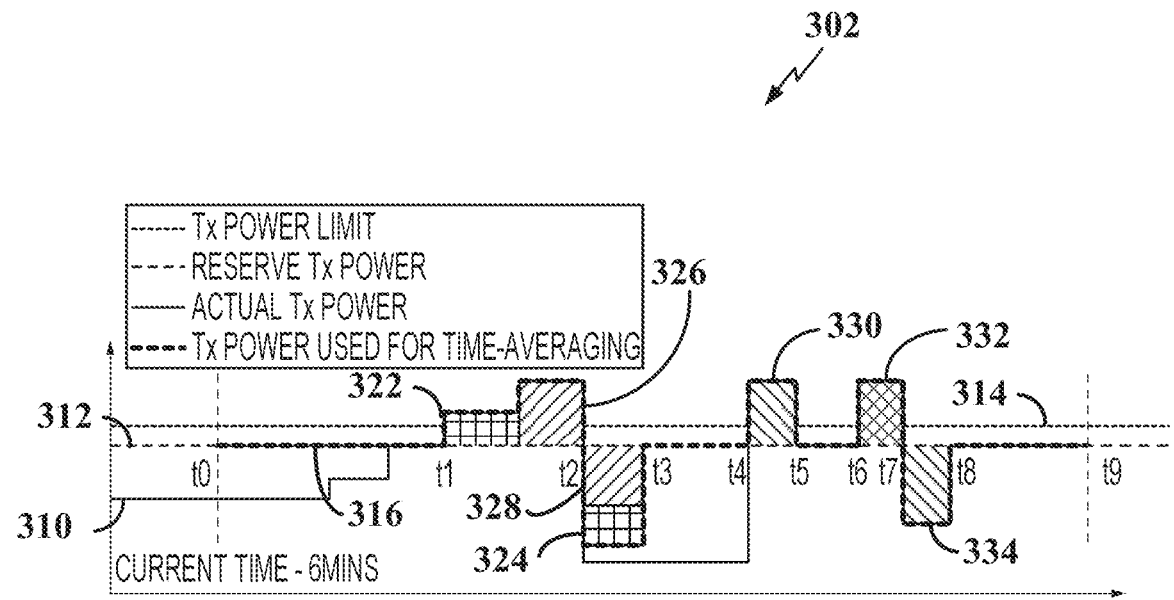
FIG. 3 illustrates a graph depicting a time-averaged transmit power versus time and a transmit power limit in a time window, in accordance with certain examples of the disclosure.

FIG. 3 is a graph of a time-averaged transmit power versus time for a single radio transmitter against a transmit power limit 314 and a reserve transmit power 312. This single radio represents the primary radio as discussed herein in that it is operating without any constraint from or cooperation with another radio. The actual transmit power 310 for an example radio transmitter of a wireless device is shown as a function of time for purposes of illustrating principles of the reserve transmit power. As shown by the movement of the actual transmit power 310 on the vertical axis the power level varies as multiple transmissions occur. Some of these transmissions may be voice communications, while others may be data transmissions. In addition, the wireless device may shift between multiple technologies and frequency bands, as the type of transmission changes. The average transmit power is determined across, for example, a six minute, time window with a duration from a time t9, the current time to time t0, current time minus 6 minutes, 6 minutes is used as an example and any other suitable time window duration as defined by the regulator may be used. To describe this example, time markers t0 to t9 are marked at uneven intervals based on the transitions in the actual transmit power 310. In the illustrated example, at time t9, the primary radio average transmit power will be the transmit power from t0 to t9 averaged over the 360 seconds of the current time window. The time-averaged transmit power is averaged over the entire time window. After 5 seconds, at time t10, a new evaluation is performed between t10 and t0+5 s. This establishes a new time window and the average transmit power at each rolling time window changes after each interval. While 5 second intervals are described as an example herein, larger or smaller intervals may be used to evaluate the transmit power limits for all active radios of ongoing communication.

The primary radio average transmit power is compared to a transmit power limit 314 and a reserve transmit power 312. The transmit power limit may be due to SAR or other restriction on total transmit power during the time window. All of the values shown in FIG. 3 are normalized on the vertical axis to the transmit power limit 314, shown in this example as 100 mW. The transmit power limit 314 is therefore equal to 1.0. Similarly, the reserve transmit power 312 in FIG. 3 represents a reserve level in normalized units, i.e., reserve transmit power/transmit power limit. The time-averaged transmit power is restricted to within the transmit power limit. The reserve transmit power 312 is used to provide a margin between the actual transmit power 310 and the transmit power limit 314. By preserving a power margin, the transmitter is allowed to transmit some higher power signals when necessary. The choice of reserve transmit power 312 below the transmit power limit 314 threshold may be configurable. Selecting a higher level for the reserve transmit power 312 will allow for shorter duration of high power burst-transmissions as more margin is reserved. However, since the communication device is guaranteed to always transmit at this higher reserve power, the communication device has a higher likelihood to survive bad cell coverage areas with poor reception. Similarly, selecting a lower reserve power level will provide longer durations of high power burst-transmissions, but the communication device is likelier to drop radio connection in bad coverage areas as it can only guarantee this lower reserve of transmit power.

In this example, a separate dashed line shows how the time-averaged power 316 of the transmitter, in this example, the primary radio average transmit power is determined using the actual transmit power 310. As shown, all of the transmit powers below the reserve transmit power 312 (between t0 and t1, and between t3 and t4), are treated as if the transmission was at the reserve transmit power 312. All transmit powers above the reserve transmit power 312 (seen between t6 and t7, for example) are treated as is.

An exception to the above occurs when low transmit power bursts immediately follow high transmit power bursts. This is shown by the high transmit power used at time t1 through t2 and also at time t4. In each case, the high power is followed by a low transmit power (below the reserve transmit power 312). More specifically, the actual transmit power 310 has a first high power burst 322 at time t1. This is canceled by a first portion 324 of an immediate lower power burst at time t2. A second high power burst 326 after time t1 is canceled by a second portion 328 of the immediate lower power burst at time t2. A third high power burst 330 at time t4 is canceled by a second immediate low power burst 334. A fourth high power burst 332 at time t6 has no corresponding low power burst. This short-term averaging means that the margin provided by the difference between the transmit power limit 314 and the reserve transmit power 312 is not used except by the fourth high power burst 332 which does not fully consume this margin and permits the radio connection to be maintained at greater than the reserve transmit power 312 until this margin is fully consumed. Once this is fully consumed in the past time window (360 s in this example), then the radio transmit power cannot exceed reserve transmit power 312 until some of this margin becomes available due to a rolling time-average window. As shown in this example, the long-term average of the transmit power over the time window remains within the exposure threshold. The time-averaging algorithm ensures that reserve transmit power is available for future transmission by making certain that the transmit power does not exceed the margin provided by the difference between the transmit power limit 314 and the reserve transmit power 312 over the time-averaging window.

Any of a variety of different time averaging techniques may be used. The present cancelation approach is particularly suitable for an interval-based time window. Considering a time window beginning at time t6 both the fourth high power burst 332 and the second immediate low power burst 334 are within the time window for counting, and they can cancel each other. At the next interval starting at time t7, the fourth high power burst 332 will no longer be within the time window and will not be counted. The second immediate low power burst 334 is below the reserve transmit power 312 and also will not be counted. The result is the same as when the two bursts canceled. If a high power burst comes after a low power burst, then they do not cancel because at a later time interval only the high power burst remains in the time window. Removing the cancel effect of the preceding low power burst would significantly increase the average power based on a past burst and upset the rolling time average creating unstable behavior. The time-averaged power 316 shows the result of applying the averaging rules, including the rolling time-average window, described above.

As shown, the fourth high power burst 332 and the second immediate low power burst 334 provide a short-term burst of higher power followed by a power back-off. This process may be repeated over a period of time. This provides for using the reserve transmit power proportionally to back off the transmit power level earlier, allowing the reserve transmit power to be maintained during the rolling time-average window. In this example, the radio connection is maintained while providing short bursts of high power when the transmit power margin is available.

Transmit power samples may be taken at fixed time intervals, such as five seconds. This fixed time interval may apply to all technologies and bands on a wireless device. A mobile device may operate on multiple frequency bands using multiple antennas. Each antenna produces a characteristic emission pattern. These patterns are different for different frequency bands and each type of antenna produces a different emission pattern. Different patterns generated by different frequencies and antennas produce exposure values that reach a maximum differently. There is a transmit power limit that is set for that frequency band. The reserve transmit power 312, the relative back-off from the transmit power limit 314 may differ by band. If the mobile device transitions to a different band at a different frequency the transmit power limit 314 may change. In such a case, a margin may be subtracted to generate a new reserve transmit power for that band. The subtraction helps provide for transmit power to be reserved as a fraction of the transmit power limit 314. In one example scenario, a mobile device starts transmitting in a higher power band (e.g., above the transmit power limit 314) and then moves to a lower power band (e.g., below the transmit power limit 314). The SAR value increases for the same transmit power level. In this scenario, the reserve transmit power 312 reverts to a lower power limit. A reserve transmit power may be based on a relative percentage of the current SAR limit indicated here by the transmit power limit 314.

Using a fixed time interval may allow for seamless time averaging of the transmit power values. Since different technologies change power at different rates, all transmission powers may be averaged at the same constant time intervals and recorded in the memory (e.g., memory 212) for use in time-averaging. The average may be used to allow the high and low power transmission to cancel out in the time-averaging window. In addition, the average may be used to maintain the average transmit power at the reserve transmit power 312.

Considering the reserve transmit power 312 and the average transmit power, the mobile device, in general, is driven to use all of the reserve transmit power. This transmit power is enough to sustain a call or session and allows a margin to be reserved for occasional high power bursts. The time-averaging approach, including the moving window for taking the average and the canceling of high power bursts, may be used to guarantee that some transmit power is reserved in the margin between the reserve transmit power and the transmit power limit for future transmissions. The energy used for high power bursts does not exceed the margin provided by the difference between the transmit power limit and the reserve transmit power over the averaging time window. This may be expressed as a relation as follows:

$$\text{Total\_usable\_margin} = (Tx \text{ power limit} - \text{reserve } Tx \text{ power}) * (\text{time\_window}/\Delta t) \quad \text{(Eq. 1)}$$

where Total_usable_margin is the amount of transmit power that is available for the transmitter to use for high power bursts, Tx power limit is the transmit power limit 314 of FIG. 3, reserve Tx power is the reserve transmit power 312 of FIG. 3, time_window is the time duration from t0 to t9 used to determine the average transmit power and $\Delta t$ is the discrete time interval at which transmit power samples are stored.

In some aspects, the interval $\Delta t$ is 0.5 seconds. Total time intervals in one 360 s window may then be 360 s/0.5 s=720.

RF exposure compliance is demonstrated using a total SAR value instead of total transmit power. For example, if the primary radio has a transmit power limit of 100 mW, which corresponds to the SAR limit, and the secondary radio has a transmit power limit of 50 mW, which corresponds to its SAR limit, then it is difficult to guarantee compliance with a total SAR limit using total transmit power as the metric. In some aspects, a normalized average transmit power over a fixed time interval is used. As an example, using the transmit power limits of 100 mW and 50 mW, respectively, and a fixed 360 s time interval, then the SAR limit is met when:

$$(360\text{s-avg transmit power of primary radio})/100 \text{ mW} + (360\text{s-avg transmit power of secondary radio})/50 \text{ mW} \le 1.0 \text{ at all times.} \quad \text{(Eq. 2)}$$

Figure 4:
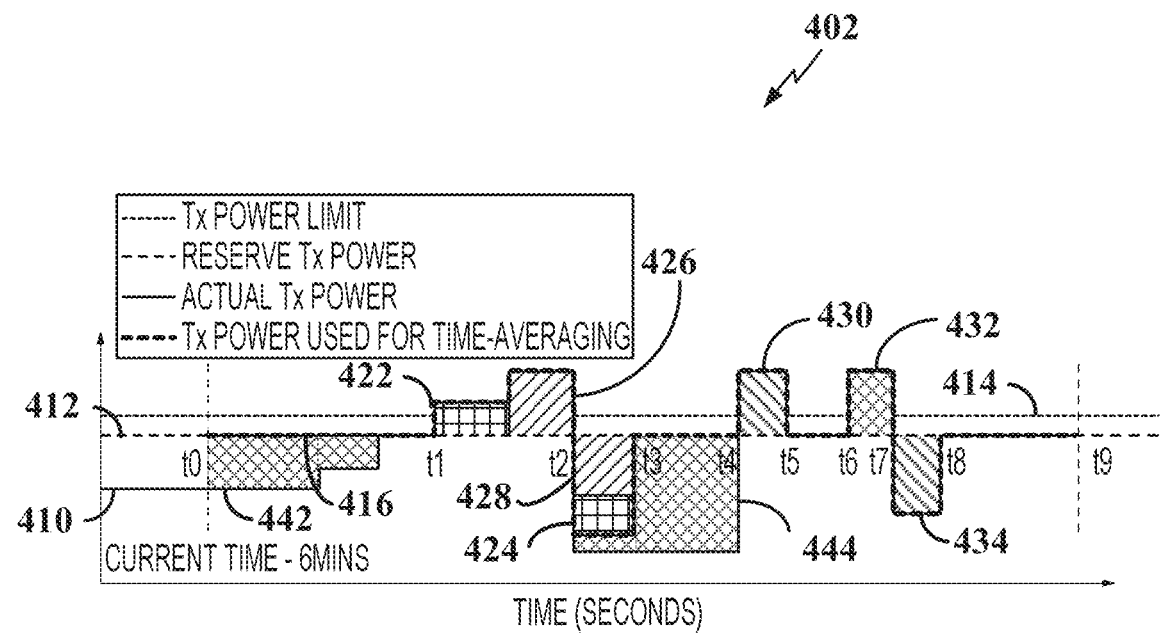
FIG. 4 illustrates a graph depicting transmit power, reserve transmit power and an unused time margin versus time in the time window for a secondary radio, in accordance with certain examples of the disclosure.

In other words, the values shown in FIG. 3 and FIG. 4 are normalized to their respective example transmit power limits 100 mW and 50 mW, respectively, such that the average limit of each corresponds to 1.0 when either of the radios are active, but the total normalized exposure may also be maintained to be $\le$=1.0 when both radios are active. Hence, all calculations may be done by normalizing each radio's transmitted power to its respective transmit power limit. In some aspects, all transmit power values for each radio are divided by their respective transmit power limits prior to storing the values in the memory, and all calculations are performed in normalized units including the allowed limit for the next time interval, $\Delta t$, and converted into allowed transmit power at the end by multiplying the normalized units with the respective transmit power limit of the respective radio.

This normalization is not only suitable for simultaneous transmission scenarios, but also for changes in the transmit power limit in a single transmitter scenario (for example for changes in the technology, band, antenna, or device position). Normalization is also suitable in simultaneous multiple transmitter scenarios (for example involving sub6 radios in which the RF exposure limit is often regulated in terms of SAR together with mmW radios in which the RF exposure in is often regulated in terms of power density (PD). These multiple transmitter scenarios may include designations such as LTE+FR2 or FR1+FR2 scenarios. Therefore, by normalizing the primary reserve transmit power and the secondary reserve transmit power to the respective transmit power limits, the reserve transmit powers are applicable for both sub6 secondary radios (LTE+FR1) and mmW secondary radios (LTE+FR2), irrespective of the way in which exposure limits are measured or expressed.

Equation 1 can also be written in terms of the normalized exposure, after dividing by the transmit power limit 314 as follows:

$$\text{normalized\_Total\_usable\_margin} = (1-\text{reserve}) * (\text{time\_window}/\Delta t) \quad \text{(Eq. 3)}$$

where reserve=reserve Tx power/Tx power limit.

Equation 3 is useful to analyze any technology, band, antenna, or device position transitions in which the transmit power limit 314 changes. Furthermore, equation 3 is useful in analyzing the overall RF exposure compliance in the presence of simultaneous transmission scenarios with more than one active transmitter. Hence, in some aspects, and as presented below, all the exposure analysis is conducted in terms of the normalized exposure which is obtained by dividing the actual transmit power by the transmit power limit for that specific technology, band, antenna, and device position combination as well an any other appropriate parameters.

Equations 1 and 3 suggest that at any particular time, the amount of margin available to be used for a high-power burst for the next $\Delta t$ time interval, normalized_available_margin, may be defined as:

$$\text{normalized\_available\_margin} = \text{normalized\_Total\_usable\_margin} - \text{normalized\_used\_margin,} \quad \text{(Eq.4)}$$

where the normalized_used_margin is the area in the high power burst 332 divided by the time interval $\Delta t$. Here, this margin is in addition to the reserve transmit power 312 that is always guaranteed.

In some aspects, the mobile device has two radios that transmit simultaneously or in an interleaved configuration. For example, the first radio may an LTE radio and the second radio may be a New Radio (NR) in Non Standalone (NSA) scenario or the first radio may be for a Primary Component Carrier (PCC) and the second radio for a Secondary Component Carrier (SCC) in LTE Uplink Carrier Aggregation (ULCA). The transmit power limit 314 for each radio is determined based on the RF exposure metric (specific absorption rate or power density) that can vary depending on radio protocol, radio frequency, transmitting antenna and device position (see [0004]). The combined RF exposure metric of both radios (or all active radios if more than two radios are transmitting) should comply with the regulatory limits. In other words, the total of the time-averaged (over the past time window) transmit power of each radio relative to its corresponding transmit power limit 314 for all active radios should not exceed 1.0.

In some aspects, one radio is a primary radio and the other radio is a secondary radio. When only the primary radio is transmitting, it operates as described above transmitting up to the reserve transmit power and not exceeding the transmit power limit on average with high transmit power bursts. The secondary radio may then also begin transmitting using any unused margin from the primary radio. The designation of primary radio and secondary may be modified to suit different circumstances. In other words, when one radio is transmitting without the other, then it may be the primary radio. When the other radio is transmitting without the one, then it may be the primary radio. There may also be more than two radios in some examples.

There are many different ways to allocate available transmit power between a primary radio and a secondary radio. In some aspects, the primary radio is given preference over the secondary radio and the secondary radio transmits only using power that has not been used by the primary radio.

FIG. 4 is a graph of transmit power versus time for the secondary radio against a secondary transmit power limit 414 and a secondary reserve transmit power 412. The actual transmit power 410 for an example secondary radio of a wireless device is shown as a function of time. The movement of the secondary radio actual transmit power 410 on the vertical axis is the same as in FIG. 3 to show how the secondary radio power is accommodated under the same circumstances as for FIG. 3. The actual transmit power of any radio at any particular time may be in any other pattern that is appropriate for the modulation scheme, protocol, and traffic demands. The average time is determined across, for example, the same six minute, time window with a duration from a time t9, the current time to time t0, current time minus 6 minutes. As in FIG. 3, all of the values shown in FIG. 4 are normalized on the vertical axis to the transmit power limit 414, shown in this example as 50 mW. The transmit power limit 414 is therefore equal to 1.0.

In this example, the secondary radio average transmit power (i.e., the average of the actual transmit power 410) is limited to the average unused margin, where normalized_unused_margin, of the primary radio, i.e., $$\text{normalized\_unused\_margin} = (\text{normalized\_total\_uisable\_margin} - \text{normalized\_used\_margin\_of\_primary\_radio}) \quad \text{(Eq. 5)}$$

and $$\text{average\_normalized\_unused\_margin} = \text{normalized\_unused\_margin} * (\Delta t / \text{time\_window}) \quad \text{(Eq. 6)},$$

to ensure that the combined RF exposure from both radios meets regulatory requirements. The average_normalized_unused_margin in Equation 6 can be converted into a secondary radio average transmit power limit by multiplying the transmit power limit 414 of the secondary radio, i.e., =average_normalized_unused_margin*secondary transmit power limit. If the secondary reserve level (i.e., the secondary reserve transmit power/secondary transmit power limit) were to be allocated such that the secondary radio can be maintained at a minimum of this level, then cancellations similar those shown and described with reference to FIG. 3 can be performed if there is sufficient unused margin from the primary radio. In other words, high power bursts 422, 426, and 430 can get cancelled by transmissions 424, 428, 434 below the reserve level. Similarly, transmissions 442, 444 below the reserve level will be replaced by the level of the secondary reserve transmit power 412 (making this estimate conservative) and the uncancelled high power burst 432 being counted as it is in the same way as in FIG. 3.

Within the available transmit power, there remains some unused margin due to transmissions 442, 444 for the secondary radio. This may be seen as the unused portions of the secondary reserve. However, by keeping these portions of the secondary reserve unused, i.e., replacing them with the secondary reserve transmit power 412 can be sustained for future transmissions of the secondary radio, for example for transmissions that are exactly one time window later. Transmissions one time window later are represented as a reserve level that is rolling out of one time window into the next. This unused part of the allocated power budget is unused power margin that may be made immediately available to the secondary radio, but that implies that the secondary reserve transmit power cannot be guaranteed in future transmissions when transmissions 442 or 444 roll out of the current time window into the next time window.

As shown in FIG. 4, when the secondary radio is first turned ON, the secondary transmit power 410 is zero everywhere in FIG. 4. The estimated margin (represented earlier by transmissions 442, 444) for the secondary radio to preserve the secondary reserve transmit power includes the entire area under the secondary reserve transmit power 412. In other words, the area under the secondary reserve transmit power 412 may be estimated when the secondary radio is first turned ON. As the secondary radio continues transmission, this estimated margin is represented by only the unused power due to transmissions 442, 444 after cancellations with high power transmissions. Therefore, this estimated margin to maintain the secondary reserve transmit power keeps changing depending on how the secondary radio transmit power has varied with time for one past time window.

In some aspects, determining the unused power margin further comprises reducing the normalized_unused_margin in Eq.5 by a secondary radio estimated normalized margin in the current time window. This may be illustrated as the two areas of unused power due to transmissions 442, 444 divided by Δt. The secondary radio estimated margin represented by the unused power areas from transmissions 442, 424 may be computed based on the secondary reserve transmit power 412 and the actual normalized transmit power 410 after normalizing by dividing by the transmit power limit 414 of the secondary radio.

In some aspects, the reserve transmit power of the primary radio (global reserve) is always guaranteed for the primary radio at all times. In some aspects, there is a secondary reserve transmit power that is only allocated after the secondary radio turns ON and de-allocated after the secondary radio is turned OFF. As a result, there is no guaranteed secondary reserve. In some circumstances, the primary radio could have used up all the margin. After the secondary radio turns ON, if there is enough margin available, then some margin may be taken from the primary radio and allocated to the secondary radio. Similarly, after the secondary radio is turned OFF, the margin may be de-allocated and returned to the primary radio. This may be the unused power margin due to transmissions 442,444 described above. These portions are under the secondary reserve transmit power but could not be cancelled by higher power transmissions. Note that the available margin changes based on the operation and usage of the secondary radio, for example, when the secondary radio has just turned ON.

In some aspects, the total reserve transmit power, i.e., the primary reserve transmit power 312 and the secondary reserve transmit power 412 is allocated entirely to the primary radio when the secondary radio is OFF. When the secondary radio is turned ON, then the total reserve transmit power may be split between the primary radio and the secondary radio. In other words, the allocation is changed so that the secondary radio is allocated a finite margin when it is turned ON. In some aspects, the allocation to the secondary radio occurs immediately with a concurrent reduction in the reserve transmit power of the primary radio. With the use of a time averaging window, the allocation to the primary radio is changed at each interval. Δt. As a result, the primary radio allocation will only change at the end of the first interval Δt, indicated as 0.5 s in one example. With 720 intervals Δt in a single time window in this example, the impact on the primary radio will be small and will slowly increase with each interval until, at the end of one complete time window, the complete allocation from the primary radio to the secondary radio will occur. During that complete time window, the secondary radio will have a smaller allocation and may be able to use unused portions of the reserve transmit power and the margin of the primary radio.

When the secondary radio is limited to unused portions of the margin for the primary radio, there may be no transition to a secondary reserve transmit power or to a margin for the secondary radio. On the other hand, when a secondary reserve transmit power is allocated to the secondary radio, then there is a transition time during the time-averaging of the actual transmit power of the primary radio and of the secondary radio. The margin may also be allocated so, for example, the margin for the primary radio may be expressed as x % of the total available margin and the margin for the secondary radio may be expressed as (100–x) % of the total margin. In this way, using the moving average of the time window for each interval Δt, the transmit power of the primary radio is limited to the reserve transmit power allocated to the primary radio plus the unused margin out of the margin allocated to the primary radio which can be expressed as x % of the total margin power. In the same way, for each interval, Δt, the transmit power of the secondary radio is limited to the secondary reserve transmit power allocated to the secondary radio plus the unused margin out of the margin allocated to the secondary radio which can be expressed as (100–x) % of the total margin power.

When there is no particular allocation to the secondary radio (i.e., no secondary reserve transmit power 412), then the available transmit power for the secondary radio varies over time and must be determined with each time interval. Such a situation occurs when the secondary radio uses only the transmit power that has not been used by the primary radio. In this case, the secondary radio will use as much of the available transmit power as is not used by the primary radio and then drop out, until more transmit power becomes available. The continued transmission of the secondary radio cannot be assured when the primary radio may consume all of the available power at any time.

In some aspects, the margin is allocated to the secondary radio. The primary radio operates within the reserve transmit power or a new reserve transmit power configured for use when both radios are operating. When the secondary radio has some certain allocation, then it can operate in different ways to suit the needs of the particular radio or the particular configuration. When the secondary radio turns ON, the primary radio is limited to its primary radio reserve transmit power 312 until there is sufficient allocation for a secondary radio reserve transmit power. According to an Option A, the secondary radio uses all of the transmit power available to it and then stops transmitting if the available transmit power is consumed. During the transition to the secondary reserve transmit power, there is no limit on the secondary radio other than that imposed by the primary radio's use of the available transmit power. According to an Option B, the secondary radio transmits only under a secondary reserve transmit power 412 allocated to it and then stops transmitting if all of the transmit power available to it is consumed. According to an Option C, the secondary radio transmits only under a finite level that is equal to the average exposure margin available, i.e., (100%–x %)*(secondary radio average transmit power limit 414), where x % is the exposure margin consumed by primary radio. The secondary radio is limited to the finite margin for the entire time window. In this case, the secondary radio is limited to staying under a finite transmit power level, which may be very low at the start of the transition until it increases to secondary reserve transmit power 412 after primary exposure usage x % has been sufficiently restricted over time. According to an Option C, the secondary radio transmits only under a finite transmit power level allocated to it and preserves a margin that may be used in case there are any high power pulses to transmit only after this finite transmit power level reaches secondary reserve transmit power 412.

Figure 5:
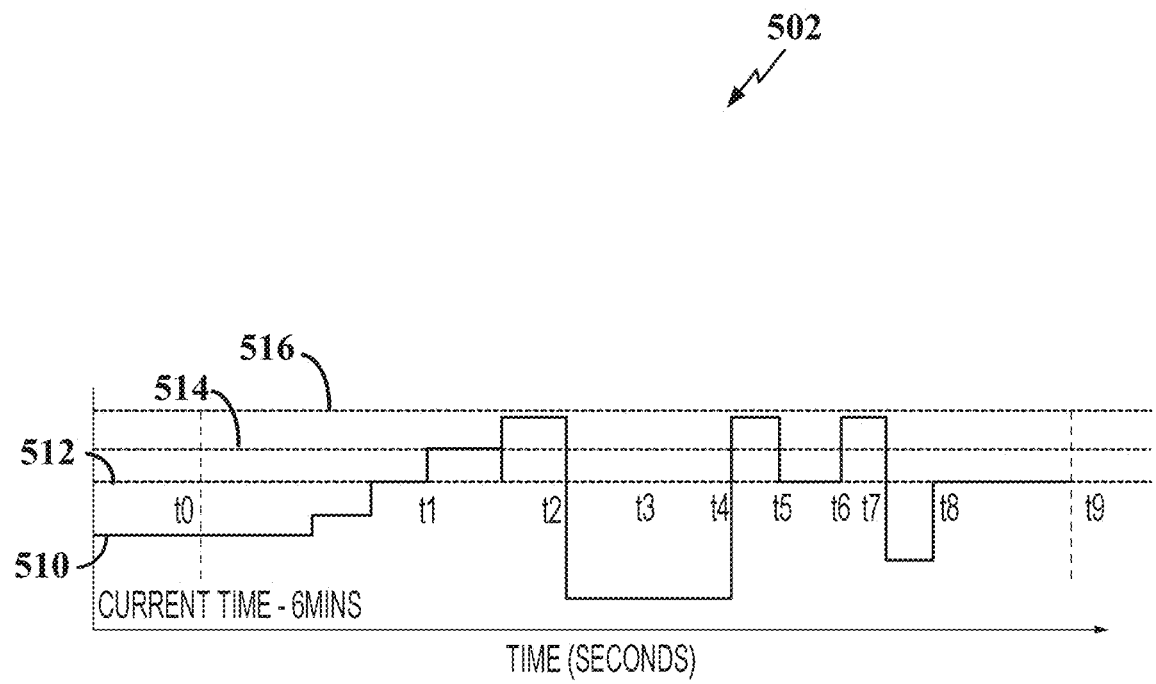
FIG. 5 illustrates a graph depicting transmit power versus time for two radio transmitters against a primary reserve transmit power, a secondary reserve transmit power and the transmit power limit in the time window, in accordance with certain examples of the disclosure.

FIG. 5 is a graph 502 of a normalized transmit power ratio 510 (transmit power 310 divided by primary transmit power limit 314) versus time for the primary radio against a normalized transmit power limit 516, equal to 1 representing 100%. FIG. 5 is essentially the same as FIG. 3 normalized to or divided by the primary transmit power limit 314. Here, the primary reserve 512 is a ratio of the primary reserve transmit power 312 to the primary transmit power limit 314. Also illustrated are combined primary and secondary reserves 514. Here, the difference between the combined primary and secondary reserves 514 and the primary reserve 512 represents the secondary reserve, which is the secondary reserve transmit power 412 divided by the secondary transmit power limit 414. The normalized transmit power ratio 510 for an example primary radio of a wireless device is shown as a function of time. The actual transmit power of any radio at any particular time may be in any other pattern that is appropriate for the modulation scheme, protocol, and traffic demands.

When only the primary radio is active (i.e., when the secondary radio is turned OFF), the available margin for high power transmissions is the difference between the primary reserve 512 and the normalized transmit power limit 516 (equal to 1, representing 100%). When both the primary radio and the secondary radio are turned ON and reserve margins for both radios are allocated (i.e., the combined primary and secondary reserves 514), then the total margin available for both radios is the difference between the total combined primary and secondary reserves 514 and the normalized transmit power limit 516 equal to 100%. The area below the normalized primary reserve 512 is reserved for the primary radio. In some aspects, the secondary radio is limited to the margin between the total combined primary and secondary reserves 514 and the normalized primary reserve 512 (i.e., the secondary reserve) and the unused margin of the primary radio between the total combined primary and secondary reserves 514 and the total normalized transmit power limit 516 representing 100%. In some aspects, the secondary radio uses the secondary radio margin only to the extent that the primary radio has not used it.

Figure 6:
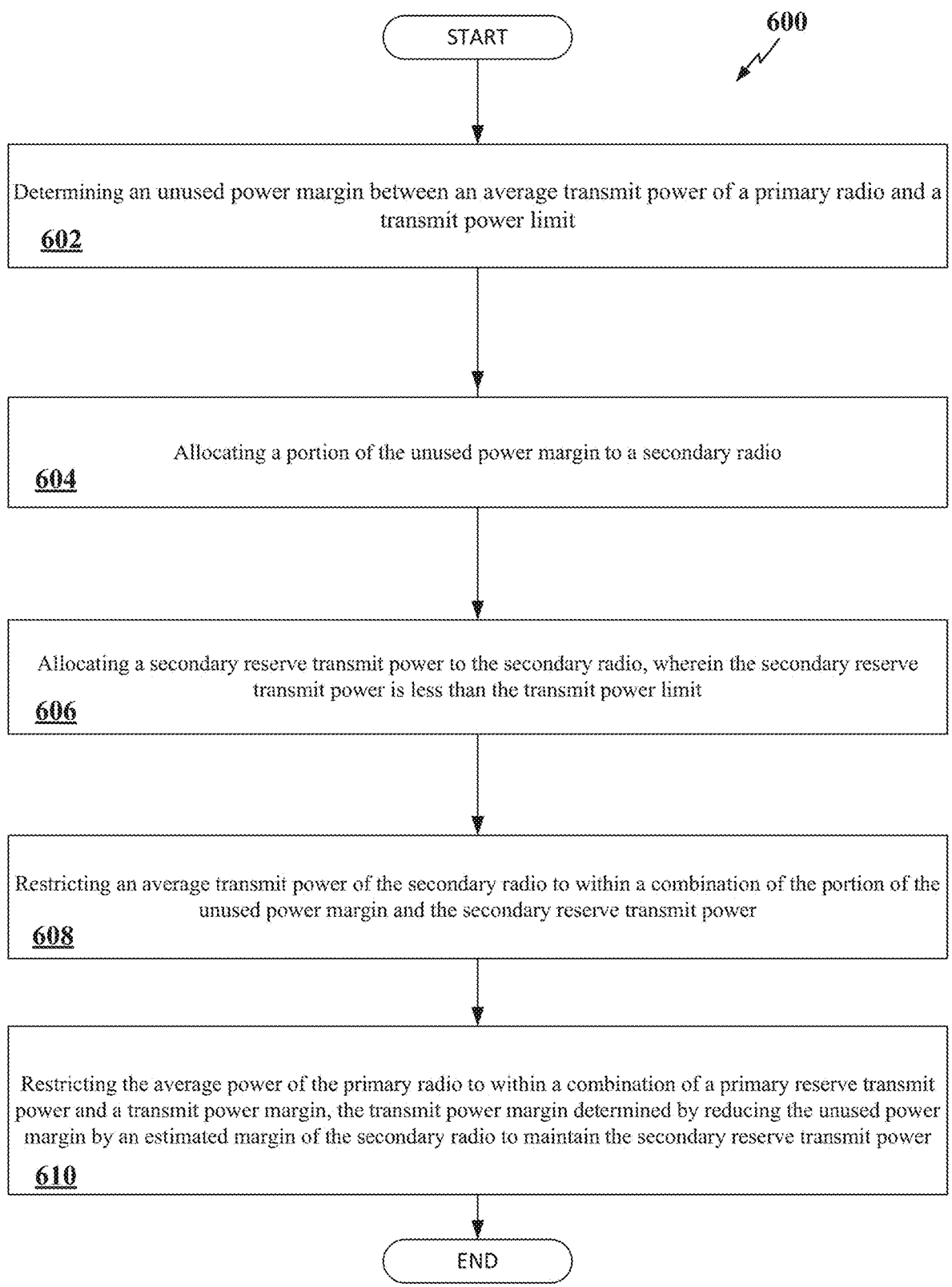
FIG. 6 illustrates a flow diagram of a method restricting the transmit power of a primary and secondary radio in accordance with a transmit power limit, in accordance with certain examples of the disclosure.

FIG. 6 is a process flow diagram illustrating an example of a method for restricting transmit power for two radios in a wireless device. The method 600 begins at block 602 with determining an unused power margin between an average transmit power of a primary radio and a transmit power limit. In some aspects, the average transmit power of the primary radio is calculated over a time window that can be divided into a sequence of time intervals, and the time window may advances each time interval of the sequence to include a fixed number of time intervals (e.g., such that the average transmit power is calculated for a sliding time window).

Allocating a portion of the unused power margin to a secondary radio is performed in block 604. In some aspects, a primary reserve transmit power is allocated to the primary radio. A primary reserve transmit power is less than the transmit power limit and restricting the transmit power of the primary radio comprises allowing transmit power up to the primary reserve transmit power during the current time interval. In some aspects, the transmit power limit is based on a radio frequency exposure limit. The radio frequency exposure limit is based on the exposure characteristics of the primary radio. The radio frequency exposure limit may be different for different radios.

Optionally, it is determined whether a secondary radio is turned ON. When the secondary radio is turned ON, an unused power margin between the current time-averaged transmit power and the transmit power limit may be determined. In some aspects, the determined unused power margin is within the primary reserve transmit power. In some aspects, the determined unused power margin is between the primary reserve transmit power and the transmit power limit. In some aspects, the unused power margin includes both. In some aspects, determining the unused power margin includes reducing the unused power margin by a secondary radio estimated margin in the current time window. The secondary radio estimated margin may be computed based on a secondary reserve transmit power and an average transmit power of the secondary radio.

Allocating a portion of the unused power margin to the secondary radio is performed in block 606. This may be performed after detecting that the secondary radio is turned ON. The portion may be all or only a small part of the unused power margin, for example such that some of the unused power margin can be allocated to the primary radio. A secondary reserve transmit power may also be allocated to the secondary radio. This may be performed after detecting that the secondary radio is turned ON, wherein the secondary reserve transmit power is less than the transmit power limit. De-allocating the secondary reserve transmit power from the secondary radio back to the primary radio may happen after detecting that the secondary radio is turned OFF. In examples, the secondary reserve transmit power is less than 100% of the secondary transmit power limit.

Restricting an average transmit power of the secondary radio to within a combination of the portion of the unused power margin and the secondary reserve transmit power is performed in block 608. In some aspects, the average transmit power of the secondary radio is restricted to the portion of the unused power margin and the secondary reserve transmit power during the current time interval. In some aspects, the average transmit power of the secondary radio is restricted to the secondary reserve transmit power with or without the unused margin. In some aspects, restricting the average transmit power of the secondary transmit radio includes terminating transmission by the secondary radio during the current time interval after the average transmit power of the secondary radio exceeds the unused margin. In some aspects, restricting the average transmit power of the secondary radio includes determining an average transmit power of the secondary radio across a current time interval after detecting that the secondary radio is turned ON and determining a new average transmit power of the secondary radio after each time interval to include a new current time interval up to the fixed number of time intervals of the current time window.

With a secondary reserve transmit power, the average transmit power of the primary radio may be further restricted at block 610. Restricting the average transmit power of the primary radio may include further restricting the average transmit power of the primary radio to within a combination of a primary reserve transmit power and a transmit power margin, the transmit power margin determined by reducing the unused power margin by a secondary radio estimated margin to maintain the secondary reserve transmit power.

Figure 7:
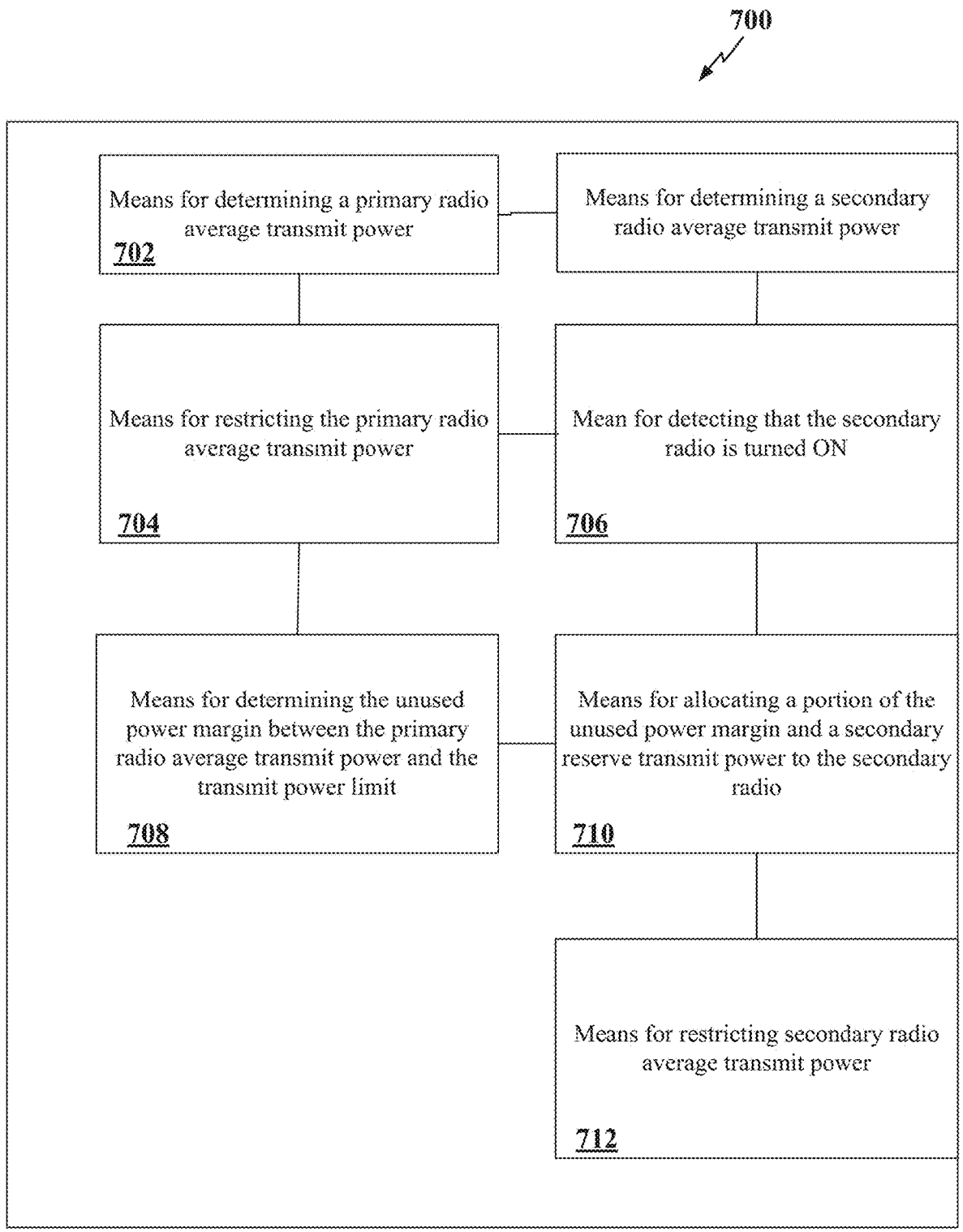
FIG. 7 illustrates a block diagram of an apparatus for restricting the transmit power of a primary and secondary radio in accordance with a transmit power limit, in accordance with certain examples of the disclosure.

FIG. 7 is a functional block diagram of an apparatus for restricting the transmit power of primary and secondary radios. The apparatus 700 comprises means for determining 702 a primary radio average transmit power across a time window at a sequence of time intervals, wherein the time window advances each time interval of the sequence to include a fixed number of time intervals. The apparatus 700 further includes means for restricting 704 the primary radio average transmit power during a current time interval to within a transmit power limit for a current time window using a current time-averaged transmit power of the current time window.

For the secondary radio, the apparatus 700 includes means for detecting 706 that a secondary radio is turned ON, means for determining 708 an unused power margin between the current time-averaged transmit power and the transmit power limit, means for allocating 710 a portion of the unused power margin and a secondary reserve transmit power to the secondary radio. The secondary reserve transmit power may be less than the transmit power limit. The apparatus further includes means for restricting 712 a secondary radio average transmit power to within the unused power margin.

The means for restricting the primary radio average transmit power further restricts the primary radio average transmit power after detecting that the secondary radio is turned ON. The primary radio average transmit power is restricted to within a combination of primary reserve transmit power and the transmit power margin determined after reducing the unused power margin by a secondary radio estimated margin to maintain the secondary reserve transmit power. These amounts are determined and then allocated in the means for allocating.

Figure 8:
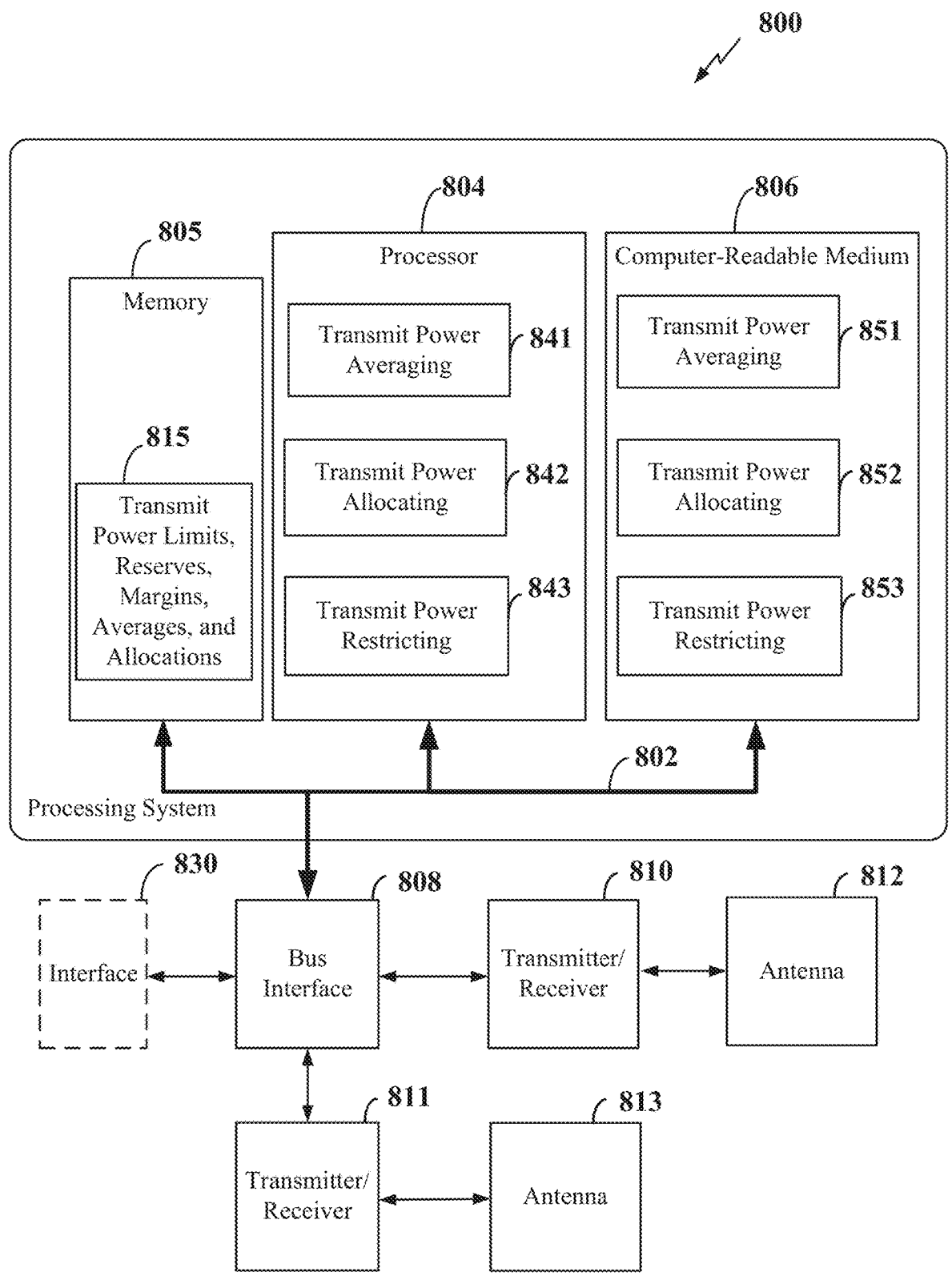
FIG. 8 illustrates a block diagram of an example hardware implementation for a wireless device having a processor and a memory, among other components.

FIG. 8 illustrates a block diagram of an example of a hardware implementation for a wireless device 800, such as a UE or any other suitable wireless device, employing a processing system 814, as discussed in any one or more of FIGS. 1-7. In accordance with various aspects of the disclosure, an element, or any portion of an element, or any combination of elements may be implemented with the processing system 814. The processing system 814 may include one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless device 800 may be configured to perform any one or more of the functions described herein. That is, the processor 804, as utilized in a wireless device 800, may be used to implement any one or more of the processes and procedures described herein.

The processor 804 may in some instances be implemented via a baseband or modem chip and in other implementations, the processor 804 may itself comprise a number of devices distinct and different from a baseband or modem chip (e.g., in such scenarios as may work in concert to achieve examples discussed herein). And, as mentioned above, and shown in FIG. 2, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806) having instructions stored thereon. The bus 802 may also link various other circuits such as timing sources, peripherals, voltage regulators, and power management circuits, which are well known in the art, and therefore, will not be described any further. A bus interface 808 provides an interface between the bus 802 and a primary radio shown as a first transmitter/receiver 810 or transceiver and a first at least one antenna 812 and between the bus 802 and an interface 830. The first transmitter/receiver 810 provides a communication interface or means for communicating through the first at least one antenna 812 with various other apparatus over a wireless transmission medium. The bus interface 808 also provides an interface between the bus 802 and a secondary radio shown as a second transmitter/receiver 811 an a second at least on antenna 813. In some examples, the wireless device may include two or more transceivers, each configured to communicate with a respective network type (e.g., terrestrial or non-terrestrial) through the same or different antennas. The interface 830 provides a communication interface or means of communicating with various other apparatuses and devices (e.g., other devices housed within the same apparatus or other external apparatus) over an internal bus or external transmission medium, such as an Ethernet cable. Depending upon the nature of the apparatus, the interface 830 may include a user interface (e.g., keypad, display, speaker, microphone, joystick). Of course, such a user interface is optional, and may be omitted in some examples, such as an IoT device.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The wireless device 800 may be configured to perform any one or more of the operations described herein (e.g., as described above in conjunction with FIGS. 1-7). In some aspects of the disclosure, the processor 804, as utilized in the wireless device 800, may include circuitry configured for various functions.

The processor 804 is coupled to the memory 805 through the bus 802. The memory includes transmit power limits, reserves, margins, averages, and allocations 815 that may be used for restricting transmit power within margins and allocations and which may also include tables, maps or other data structures that indicate the current and average transmit power for each of multiple different radios, such as one or more transmitter/receivers 810.

The processor 804 may include transmit power averaging circuitry 841 to determine a first time-averaged transmit power of a primary radio and a second time-averaged transmit power of a secondary radio. The transmit power averaging circuitry 841 may be configured to detect operation or commands to the first transmitter/receiver 810 and the second transmitter/receiver 811. The transmit power averaging circuitry 841 may include one or more hardware components that provide the physical structure that performs various processes related to determining transmit power and averaging the power through time windows at time intervals and combining the averages. The transmit power averaging circuitry 841 may further be configured to execute transmit power averaging software 851 included on the computer-readable medium 806 to implement one or more functions described herein.

The processor 804 may include transmit power allocating circuitry 842 configured to perform unused margin, and reserve power determining and allocating operations as discussed herein. The transmit power allocating circuitry 842 may include functionality for a means for determining an unused power margin, means for determining a reserve power and means for allocating the unused power margin and reserve power to the secondary radio. The transmit power allocating circuitry 842 may further be configured to execute transmit power allocating software 852 included on the computer-readable medium 806 to implement one or more functions described herein.

The processor 804 may include transmit power restricting circuitry 843 configured to perform operations restricting the transmit power of the primary radio and restricting the transmit power of the secondary radio as discussed herein. The transmit power restricting circuitry 843 may include functionality for a means for restricting the transmit power to within transmit power limits for a current time window using a current time-averaged power of a current time window. The transmit power restricting circuitry 843 may further be configured to transmit power restricting software 853 included on the computer-readable medium 806 to implement one or more functions described herein.

The circuit architecture described herein may be implemented on one or more ICs, analog ICs, RFICs, mixed-signal ICs, ASICs, printed circuit boards (PCBs), electronic devices, etc. The circuit architecture described herein may also be fabricated with various process technologies such as complementary metal oxide semiconductor (CMOS), NMOS, PMOS, bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuits described herein may be a stand-alone device or may be part of a larger device. A device may be (i) a stand-alone IC, (ii) a set of one or more ICs that may include memory ICs for storing data and/or instructions, (iii) a radio frequency integrated circuit (RFIC) such as an RF receiver (RFR) or an RF transmitter/receiver (RTR), (iv) ASICs such as a mobile station modem (MSM), (v) a module that may be embedded within other devices, (vi) a receiver, cellular phone, wireless device, handset, or mobile unit, (vii) etc.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the examples disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more examples, the functions described may be implemented in hardware, software, firmware, or any combination thereof. If implemented in software, the functions may be stored on or transmitter over as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The following provides an overview of aspects of the present disclosure:

Aspect 1: A method comprising: determining an unused power margin between an average transmit power of a primary radio and a transmit power limit; allocating a portion of the unused power margin to a secondary radio; allocating a secondary reserve transmit power to the secondary radio, wherein the secondary reserve transmit power is less than the transmit power limit; restricting an average transmit power of the secondary radio to within a combination of the portion of the unused power margin and the secondary reserve transmit power; and further restricting an average transmit power of the primary radio to within a combination of a primary reserve transmit power and a transmit power margin, the transmit power margin determined by reducing the unused power margin by an estimated margin of the secondary radio to maintain the secondary reserve transmit power.

Aspect 2: The method of aspect 1, wherein determining an unused power margin comprises normalizing the average transmit power to its transmit power limit corresponding to a radio frequency exposure limit.

Aspect 3: The method of aspect 1 or 2, wherein restricting the average transmit power of the secondary radio comprises restricting the average transmit power of the secondary radio to the unused power margin during a current time interval.

Aspect 4: The method of any one or more of aspects 1 to 3, further comprising allocating a primary reserve transmit power to the primary radio, wherein the primary reserve transmit power is less than the transmit power limit and wherein restricting the primary radio average transmit power comprises allowing transmit power up to the primary reserve transmit power during the current time interval, and wherein determining the unused power margin comprises determining the unused margin within the primary reserve transmit power.

Aspect 5: The method of aspect 4, wherein determining the unused power margin further comprises determining the unused power margin as between the primary reserve transmit power and the transmit power limit.

Aspect 6: The method of any one or more of aspects 1 to 5, further comprising computing the secondary radio estimated margin based on the secondary reserve transmit power and the average transmit power of the secondary radio.

Aspect 7: The method of any one or more of aspects 1 to 6, further comprising de-allocating the secondary reserve transmit power from the secondary radio after detecting that the secondary radio is turned OFF.

Aspect 8: The method of any one or more of aspects 1 to 7, wherein restricting the average transmit power of the secondary radio comprises restricting the secondary radio to the secondary reserve transmit power.

Aspect 9: The method of any one or more of aspects 1 to 8, wherein restricting the average transmit power of the secondary radio comprises restricting the secondary radio to the secondary reserve transmit power and the unused margin.

Aspect 10: The method of any one or more of aspects 1 to 9, wherein restricting the average transmit power of the secondary radio comprises terminating transmission by the secondary radio during the current time interval after the average transmit power of the secondary radio uses the unused margin.

Aspect 11: The method of any one or more of aspects 1 to 10, wherein restricting the average transmit power of the secondary radio comprises determining an average transmit power of the secondary radio across a current time interval after detecting that the secondary radio is turned ON and determining a new average transmit power of the secondary radio after each time interval to include a new current time interval up to the fixed number of time intervals of a current time window.

Aspect 12: The method of any one or more of aspects 1 to 11, wherein determining the average transmit power of the primary radio as an average across a time window at a sequence of time intervals, wherein the time window advances each time interval of the sequence of time intervals to include a fixed number of time intervals, and wherein the transmit power limit comprises a normalized radio frequency exposure limit using the average transmit power of the current time window.

Aspect 13: A communication device, comprising: at least one antenna; a transmitter in communication with the at least one antenna; and a processor in communication with a memory, the processor configured to perform operations comprising: determining an unused power margin between an average transmit power of a primary radio and a transmit power limit; allocating a portion of the unused power margin to a secondary radio; allocating a secondary reserve transmit power to the secondary radio, wherein the secondary reserve transmit power is less than the transmit power limit; restricting an average transmit power of the secondary radio to within a combination of the portion of the unused power margin and the secondary reserve transmit power; and further restricting an average transmit power of the primary radio to within a combination of a primary reserve transmit power and a transmit power margin, the transmit power margin determined by reducing the unused power margin by an estimated margin of the secondary radio to maintain the secondary reserve transmit power.

Aspect 14: The communications device of aspect 13, the operations further comprising allocating a primary reserve transmit power to the primary radio, wherein the primary reserve transmit power is less than the transmit power limit and wherein restricting the average transmit power of the primary radio comprises allowing transmit power up to the primary reserve transmit power during the current time interval, and wherein determining the unused power margin comprises determining the unused margin within the primary reserve transmit power.

Aspect 15: The communications device of aspect 13 or 14, the operations further comprising de-allocating the secondary reserve transmit power from the secondary radio after detecting that the secondary radio is turned OFF.

Aspect 16: The communications device of any one or more of aspects 13 to 15, wherein restricting the average transmit power of the secondary radio comprises determining a average transmit power of the secondary radio across a current time interval after detecting that the secondary radio is turned ON and determining a new average transmit power of the secondary radio after each time interval to include a new current time interval up to the fixed number of time intervals of the current time window.

Aspect 17: A non-transitory computer-readable medium having instructions stored thereon, which when executed cause a processor to perform operations comprising: determining an unused power margin between an average transmit power of a primary radio and a transmit power limit; allocating a portion of the unused power margin to a secondary radio; allocating a secondary reserve transmit power to the secondary radio, wherein the secondary reserve transmit power is less than the transmit power limit; restricting an average transmit power of the secondary radio to within a combination of the portion of the unused power margin and the secondary reserve transmit power; and further restricting an average transmit power of the primary radio to within a combination of a primary reserve transmit power and a transmit power margin, the transmit power margin determined by reducing the unused power margin by an estimated margin of the secondary radio to maintain the secondary reserve transmit power.

Aspect 18: The computer-readable medium of aspect 17, the operations further comprising determining the unused power margin further comprises determining the unused power margin as between the primary reserve transmit power and the transmit power limit.

Aspect 19: The computer-readable medium of aspect 17 or 18, the operations further comprising computing the secondary radio estimated margin based on the secondary reserve transmit power and the average transmit power of the secondary radio.

Aspect 20: An apparatus comprising: means for determining an unused power margin between an average transmit power of a primary radio and a transmit power limit; means for allocating a portion of the unused power margin to the secondary radio and for allocating a secondary reserve transmit power to the secondary radio wherein the secondary reserve transmit power is less than the transmit power limit; and means for restricting an average transmit power of the secondary radio to within the unused power margin, wherein the means for restricting the average transmit power of the primary radio further restricts the average transmit power of the primary radio to within a combination of a primary reserve transmit power and a transmit power margin, the transmit power margin determined by reducing the unused power margin by an estimated margin of the secondary radio to maintain the secondary reserve transmit power.

Aspect 21: The apparatus of aspect 20, wherein the means for restricting the average transmit power of the secondary radio performs restricting the average transmit power of the secondary radio to the unused power margin during a current time interval.

Aspect 22: The apparatus of aspect 20 or 21, wherein the means for restricting the average transmit power of the secondary radio performs terminating transmission by the secondary radio during a current time interval after the average transmit power of the secondary radio uses the unused margin.

Aspect 23: The apparatus of any one or more of aspects 20 to 22, wherein the means for determining the unused power margin determines the unused power margin between the primary reserve transmit power and the transmit power limit.

Aspect 24: The apparatus of any one or more of aspects 20 to 23, wherein the means for restricting the average transmit power of the secondary radio determines a average transmit power of the secondary radio across a current time interval after detecting that the secondary radio is turned ON and determines a new average transmit power of the secondary radio after each time interval to include a new current time interval up to the fixed number of time intervals of the current time window.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although selected aspects have been illustrated and described in detail, it will be understood that various substitutions and alterations may be made to the described examples, as defined by the following claims.

What is claimed:

1. A method comprising:
   determining an unused power margin between an average transmit power of a primary radio and a transmit power limit over a prior time interval;
   allocating a portion of the unused power margin to a secondary radio over a current time interval;
   allocating a secondary reserve transmit power to the secondary radio, wherein the secondary reserve transmit power is less than the transmit power limit;
   restricting an average transmit power of the secondary radio over the current time interval to within a combination of the portion of the unused power margin and the secondary reserve transmit power; and
   restricting an average transmit power of the primary radio over the current time interval to within a combination of a primary reserve transmit power and a transmit power margin, the transmit power margin determined by reducing the unused power margin by an estimated power margin to be made available to the secondary radio of the secondary radio to maintain the secondary reserve transmit power.

2. The method of claim 1, wherein determining an unused power margin comprises normalizing the average transmit power of the primary radio to its transmit power limit corresponding to a radio frequency exposure limit.

3. The method of claim 1, wherein restricting the average transmit power of the secondary radio comprises restricting the average transmit power of the secondary radio to the unused power margin during the current time interval.

4. The method of claim 1, further comprising allocating a primary reserve transmit power to the primary radio, wherein the primary reserve transmit power is less than the transmit power limit and wherein restricting the average transmit power of the primary radio comprises allowing transmit power up to the primary reserve transmit power during the current time interval, and
   wherein determining the unused power margin comprises determining the unused margin within the primary reserve transmit power.

5. The method of claim 4, wherein determining the unused power margin further comprises determining the unused power margin as between the primary reserve transmit power and the transmit power limit.

6. The method of claim 1, further comprising computing the estimated margin of the secondary radio based on the secondary reserve transmit power and the average transmit power of the secondary radio.

7. The method of claim 1, further comprising de-allocating the secondary reserve transmit power from the secondary radio after detecting that the secondary radio is turned OFF.

8. The method of claim 1, wherein restricting the average transmit power of the secondary radio comprises restricting a transmit power of the secondary radio to the secondary reserve transmit power.

9. The method of claim 1, wherein restricting the average transmit power of the secondary radio comprises restricting a transmit power of the secondary radio to the secondary reserve transmit power plus the unused power margin.

10. The method of claim 1, wherein restricting the average transmit power of the secondary radio comprises terminating transmission by the secondary radio during the current time interval after the secondary radio uses the unused power margin.

11. The method of claim 1, wherein restricting the average transmit power of the secondary radio comprises determining an average transmit power of the secondary radio across the current time interval after detecting that the secondary radio is turned ON and determining a new average transmit power of the secondary radio after each time interval of a sequence of time intervals to include a new current time interval up to a fixed number of time intervals of a current time window.

12. The method of claim 1, wherein
determining the average transmit power of the primary radio comprises determining as an average across a time window at a sequence of time intervals, wherein the time window advances each time interval of the sequence of time intervals to include a fixed number of time intervals, and wherein
the transmit power limit comprises a normalized radio frequency exposure limit using the average transmit power of the current time window.

13. A communications device, comprising:
at least one antenna;
a transmitter in communication with the at least one antenna; and
a processor in communication with a memory, the processor configured to perform operations comprising:
determining an unused power margin between an average transmit power of a primary radio and a transmit power limit over a prior time interval;
allocating a portion of the unused power margin to a secondary radio over a current time interval;
allocating a secondary reserve transmit power to the secondary radio, wherein the secondary reserve transmit power is less than the transmit power limit;
restricting an average transmit power of the secondary radio over the current time interval to within a combination of the portion of the unused power margin and the secondary reserve transmit power; and
restricting an average transmit power of the primary radio over the current time interval to within a combination of a primary reserve transmit power and a transmit power margin, the transmit power margin determined by reducing the unused power margin by an estimated power margin to be made available to the secondary radio of the secondary radio to maintain the secondary reserve transmit power.

14. The communications device of claim 13, the operations further comprising allocating a primary reserve transmit power to the primary radio, wherein the primary reserve transmit power is less than the transmit power limit and wherein restricting the average transmit power of the primary radio comprises allowing transmit power up to the primary reserve transmit power during the current time interval, and wherein determining the unused power margin comprises determining unused margin within the primary reserve transmit power.

15. The communications device of claim 13, the operations comprising de-allocating the secondary reserve transmit power from the secondary radio after detecting that the secondary radio is turned OFF.

16. The communications device of claim 13, wherein restricting the average transmit power of the secondary radio comprises determining an average transmit power of the secondary radio across the current time interval of a sequence of time intervals after detecting that the secondary radio is turned ON and determining a new average transmit power of the secondary radio after each time interval of the sequence to include a new current time interval up to a fixed number of time intervals of the current time window.

17. A non-transitory computer-readable medium having instructions stored thereon, which when executed cause a processor to perform operations comprising:
determining an unused power margin between an average transmit power of a primary radio and a transmit power limit over a prior time interval;
allocating a portion of the unused power margin to a secondary radio over a current time interval;
allocating a secondary reserve transmit power to the secondary radio, wherein the secondary reserve transmit power is less than the transmit power limit;
restricting an average transmit power of the secondary radio over the current time interval to within a combination of the portion of the unused power margin and the secondary reserve transmit power; and
restricting an average transmit power of the primary radio over the current time interval to within a combination of a primary reserve transmit power and a transmit power margin, the transmit power margin determined by reducing the unused power margin by an estimated power margin to be made available to the secondary radio of the secondary radio to maintain the secondary reserve transmit power.

18. The computer-readable medium of claim 17, wherein the operations for determining the unused power margin comprise determining the unused power margin as between the primary reserve transmit power and the transmit power limit.

19. The computer-readable medium of claim 17, the operations further comprising computing the secondary radio estimated margin based on the secondary reserve transmit power and the average transmit power of the secondary radio.

20. An apparatus comprising:
means for determining an unused power margin between an average transmit power of a primary radio and a transmit power limit over a prior time interval;
means for allocating a portion of the unused power margin to a secondary radio over a current time interval, and for allocating a secondary reserve transmit power to the secondary radio over the current time interval, wherein the secondary reserve transmit power is less than the secondary transmit power limit; and
means for restricting an average transmit power of the secondary radio over the current time interval to within the unused power margin,
wherein the means for restricting the average transmit power of the primary radio restricts the average transmit power of the primary radio to within a combination of a primary reserve transmit power and a transmit power margin, the transmit power margin determined by reducing the unused power margin by an estimated margin of the secondary radio to maintain the secondary reserve transmit power.

21. The apparatus of claim 20, wherein the means for restricting the average transmit power of the secondary radio performs restricting the average transmit power of the secondary radio to the unused power margin during the current time interval.

22. The apparatus of claim 20, wherein the means for restricting the average transmit power of the secondary radio performs terminating transmission by the secondary radio during the current time interval after the secondary radio uses the unused power margin.

23. The apparatus of claim 20, wherein the means for determining the unused power margin determines the unused power margin between the primary reserve transmit power and the transmit power limit.

24. The apparatus of claim 20, wherein the means for restricting the average transmit power of the secondary radio determines an average transmit power of the secondary radio across the current time interval of a sequence of time intervals after detecting that the secondary radio is turned ON and determines a new average transmit power of the secondary radio after each time interval of the sequence to include a new current time interval up to the a fixed number of time intervals of a current time window.

* * * * *